3,556,856
THREE-LAYER FUEL CELL ELECTRODE
Raymond J. Elbert, Cleveland, Ohio, assignor to Union
  Carbide Corporation, a corporation of New York
    Filed Aug. 22, 1968, Ser. No. 754,673
        Int. Cl. H01m 27/00, 27/10
U.S. Cl. 136—86                              8 Claims

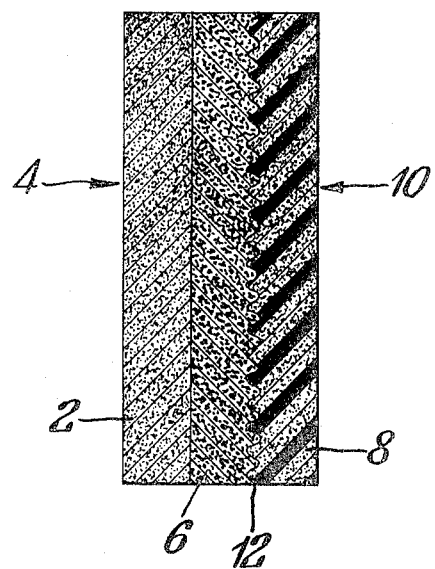

ABSTRACT OF THE DISCLOSURE

Electrodes which comprise (a) a porous metal layer having relatively fine pores forming the electrolyte side of the electrode, (b) a center layer of porous metal having relatively coarse pores, one side of which is bonded to the fine pored metal layer, and (c) a gas permeable layer of plastic bonded active material which forms the gas side of the electrode and which is bonded to the other side of the coarse pored metal layer, at least a portion of such bonding taking place through penetration of the plastic bonded material into the coarse pores.

---

This invention relates to fuel cell electrodes. More particularly, the invention is directed to three-layer fuel cell electrodes and to a method for producing such electrodes.

A wide variety of fuel cell electrodes are known, including multilayer electrode structures. Typical of multilayer fuel cell electrodes are those which comprise two metallic plaques, one with relatively large pores and another with relatively fine pores and a layer of catalytic material between the two plaques and entering to some extent the pores of the large pore layer. When used in a fuel cell, the gas pressure is adjusted so that the gas keeps the electrolyte out of the large pores of the porous plaque on the gas side of the electrode, but permits the small pores on the electrolyte side to fill with liquid and bring the electrolyte into contact with the catalytic material and the gas. This structure requires extremely close control of the gas pressure in order to obtain stable operation of the electrode and freedom from leakage of electrolyte into the gas compartment.

Another typical multilayer electrode structure is that disclosed in British Pat. 1,072,577, which describes, among other structures, a highly liquid-repellent, but gas-permeable porous nickel plaque on the gas side of the electrode and a liquid wettable, electrochemically active layer of plastic bonded carbon on the electrolyte side of the electrode. In this structure the location of the gas-liquid interface is controlled by the hydrophobicity of the structure rather than by the pressure of the fuel or oxidant gas. A disadvantage of this structure is that some electrolyte leakage may occur which tends to flood the pores of the porous nickel layer, which in turn interferes with gas flow to the active areas in the electrode and results in less efficient electrode performance.

Another type of electrode structure is the so-called "reversed" electrode which comprises a simple two-layer structure in which a porous metal plaque serves as the electrolyte side of the electrode and a highly liquid repellent plastic bonded carbon (or other active material) comprises the layer on the gas side of the electrode. This structure combines the advantages of the prior art electrodes discussed hereinabove in that the metal plaque facing the electrolyte provides good current collection, while the plastic bonding of the active material inhibits flow of electrolyte into the gas compartment and only a relatively low and easily controlled gas pressure is necessary to keep the channels in the plastic bonded layer open for entry of the gas and at the same time inhibit the flow of electrolyte through this layer. This structure, however, presents some difficulties in fabrication in that it is difficult to obtain good bonding of the layer of plastic bonded active material to the relatively small pored porous metal plaque.

The multilayer electrode structure of this invention combines the desirable features of the reversed electrode structure while at the same time permitting an improved simple method of fabrication of the electrode resulting in good bonding betwen the metal layer and plastic layer.

The electrodes of this invention are three-layer structures which comprise (a) a porous metal layer having relatively fine pores forming the electrolyte side of the electrode, (b) a center layer of porous metal having relatively coarse pores, one side of which is bonded to the fine pored metal layer, and (c) a gas permeable layer of plastic bonded active material which forms the gas side of the electrode and which is bonded to the other side of the coarse pored metal layer, at least a portion of such bonding taking place through penetration of the plastic bonded material into the coarse pores.

The invention also comprises a fuel cell system adapted to convert directly the reaction of an oxidizing gas and a fuel gas into electricity and comprising at least one fuel gas electrode, at least one oxidizing gas electrode, and an electrolyte in electrochemical relationship with these electrodes and in which at least one fuel gas electrode or oxidizing gas electrode is an electrode of this invention, as defined in the preceding paragraph.

This invention also includes a process for producing the above described three-layer electrodes, which process includes the steps of (1) providing a biporous metal sheet comprising a relatively fine pored metal layer bonded to a relatively coarse pored metal layer, (2) providing a sheet of plastic bonded active material, and (3) contacting the sheet of plastic bonded material with the coarse pored side of the biporous metal sheet under sufficient pressure to cause bonding of the two sheets, at least a portion of the bonding taking place by entry of plastic bonded material into the coarse pores of the biporous sheet.

The single figure is a cross-sectional view of a three-layer fuel cell electrode of this invention.

The three-layer electrode structure of this invention, as illustrated by the drawing, comprises a first layer of porous metal material 2 which in an operating fuel cell faces and comes in contact with fuel cell electrolyte 4. Bonded to the fine pored metal sheet is a relatively coarse pored metal sheet 6. On the opposite side of the coarse pored metal sheet is a third layer 8 which comprises particles of material active in fuel cell electrode reactions bonded together by means of a suitable plastic. This layer of plastic bonded active material is gas-permeable and in the operating fuel cell has one side bonded to the coarse pored metal layer 6 and the other side facing the supply of fuel or oxidizing gas 10. Bonding between the coarse pored metal layer and the layer of plastic bonded active material takes place along the interface 12 and at least a portion of the bonding results from penetration of the active material with its plastic binder into the coarse pores of layer 6.

In the operating fuel cell, electrolyte penetrates the fine pores of layer 2 and comes in contact with the active material in layer 8 which is partly contained in the pores of layer 6. Gas enters the layer 8 and the fuel cell electrode reactions takes place in the zone where the electrolyte and gas come in contact with each other and with the active material in the layer 8. A sufficient gas pressure may be provided to keep the gas channels in gas-permeable layer 8 open while at the same time inhibiting seepage of electrolyte through this layer and into the gas compartment 10.

The coarse pored layer and fine pored layer can be constructed of any of the metals conventionally used in fuel cell electrodes, for example, nickel, iron, silver, copper, stainless steel, Raney nickel, tantalum, and the like. The choice of metal, of course, depends on the nature of the electrolyte, whether acidic or basic, and whether or not the electrode is a fuel gas electrode or an oxidizing gas electrode, and the appropriate choice can be easily made by those skilled in fuel cell technology.

Typical useful pore size ranges for the relatively fine pored layer are in the order of an average pore size of 2 microns to 12 microns with a preferred range of 2 to 5 microns, while the relatively coarse pored layer generally has an average pore size of from 60 to 300 microns with a preferred range of from 100 to 200 microns. Large pores are desirable in the center (coarse pored) layer so that it will be relatively light in weight and with large enough pore openings so that entry of the active material and its plastic binder into the pores with good bonding can take place easily.

The particulate active material which forms a portion of the third layer of the electrode of this invention can be any of the materials active in fuel cell electrode reactions which are conventionally employed, for example, carbon, activated carbon, graphite, silver, gold, nickel, noble metals such as rhodium, paladium, and platinum black, borides such as nickel boride, or mixtures of two or more of these materials.

The plastic binder can be any gas permeable electrolyte repellent organic plastic material which is resistant to deterioration in contact with fuel cell electrolytes and includes, for example, polyethylene, polystyrene, polytetrafluoroethylene, polyperfluorochloroethylene, polyvinyl chloride and the like.

The various active materials can be included separately or as mixtures in the layer of plastic bonded active material as indicated above, or active materials which function primarily as cataysts (for example the noble metals) can be deposited on a particulate material such as carbon powder or nickel powder before plastic bonding, or such catalytic materials can be applied to the plastic bonded active material composite either before or after fabrication into the final electrode structure.

The particular structural and active materials selected and/or the catalysts employed, if any, depend on the type of fuel gas and oxidizing gas, the nature of the electrolyte, whether acidic or basic, and whether the electrode is serving as an oxidizing gas electrode or a fuel gas electrode. Again, the choice of structural materials and catalysts can be easily made by persons skilled in fuel cell technology.

The type of active materials and plastics used in fuel cell electrodes and various methods for applying catalytic materials are illustrated by the following U.S. Pats.: 2,669,598; 3,077,507; 3,307,977; 3,316,124; 3,364,074; and British Pat. 1,072,577.

In the layer comprising plastic bonded active material, the particle size of the active material is not critical but is generally in the range of 0.05 to 50 microns diameter for carbon powders, 7 to 150 microns diameter for metal powders, and about 150 A. units diameter for the catalytic active materials such as noble metals. The amount of plastic binder employed is not critical, but typically ranges from about 25 percent by weight to about 60 percent by weight of the total weight of active material and plastic binder. In general, the higher the ratio of plastic binder the greater is the inherent electrolyte repellency of this layer, and the corresponding gas pressure needed to inhibit seepage of electrolyte through the layer is correspondingly diminished. The layer of plastic bonded active material must of course be gas permeable, and gas permeability normally results from the porosity of the plastic and the presence of particulate materials therein. The size of the gas channels or pores in this layer is typically on the order of an average diameter of 0.1 to 1.5 microns.

In the process for producing the electrodes of this invention the biporous metal sheet can be prepared by known methods, for example, by placing a sheet of relatively small pored metal in contact with a sheet of relatively large pored metal and affecting bonding by roll bonding, sintering, or the like.

The sheet of plastic bonded active material can also be prepared by conventional procedures, for example, by forming a fluid mixture of particles of the active material and the plastic binder with added solvents or plasticizers to render the mixture more fluid, agitating to produce a uniform mixture, and then forming the mixture into a sheet by extrusion, calendering, or the like. Precatalyzed carbon particles produced by the methods of U.S. 3,316,124 are particularly suitable for this use.

The biporous metal sheet and the sheet of plastic bonded active material are then placed in contact with each other and subjected to pressure, or heat plus pressure, to obtain a good bond between the two sheets, at least a part of the bonding resulting from entry of the active material and its plastic binder into the pores of the coarser of the two porous metal layers.

In large scale production, it is particularly convenient to feed a long sheet of the biporous metal material and a long sheet of plastic bonded active material continuously into a rolling mill, typically at a roll pressure of 8000 to 10,000 pounds per square inch. The resulting long three-layer sheet can then be cut into smaller portions depending on the size of the electrodes desired.

Other methods for producing the electrodes of this invention start with the step of forming a liquid mixture containing the ingredients for the layer of plastic bonded active material together with suitable solvents and/or plasticizers, the liquid mixture having a paintlike or pastelike consistency. This mixture is then applied to the biporous metal sheet by brushing, spraying or casting, followed by drying and application of pressure to form the bond between the plastic bonded layer of active material and the coarse pored metal layer.

Suitable solvents and plasticizers for use in any of the above production methods can be easily selected by persons skilled in the art and include, for example, ethanol, heptane, toluene and xylene as solvents, polyvinyl alcohol, and isobutylene as plasticizers, and glycols such as ethylene glycol can serve as both solvent and plasticizer.

In addition to the advantages outlined above, electrodes of this invention can be produced which have relatively low-weight and which are extremely thin, both of these features being advantageous in the construction of compact, lightweight fuel cell batteries. For example, typical electrodes of this invention have been produced in which the fine pored metal layer is from 4 to 7 mils thick, the center coarse pored metal layer from 6 to 16 mils thick, and the layer of plastic bonded active material from 1 to 5 mils thick.

An additional thin hydrophobic layer may optionally be applied to the exposed (gas) surface of the plastic bonded carbon layer to protect against accumulation of liquid on the gas side of the electrode. This layer can be composed of liquid-repellent substances such as polytetrafluoroethylene, polyperfluoroethylene, cyclopentadiene dimer, graphite powder or other carbon powder having hydrophobic properties, or a combination of such materials.

The following examples further illustrate the electrodes of this invention and methods for making them.

EXAMPLE 1

A fluid mixture was prepared comprising 14.3 weight percent activated carbon powder, 51 weight percent ethylene glycol solvent, 12.8 weight percent polytetrafluoroethylene emulsion (60 percent solids), 2.5 weight percent twelve normal ammonium hydroxide and 19.7 weight percent polyvinyl alcohol solution (2 percent solids). After mixing, the fluid mixture had a pastelike consistency. This mixture was then cast by means of a doctor knife onto the coarse pored side of a biporous nickel sheet, the coarse pored layer of the nickel sheet being 5.4 mils in thickness, and the fine pored layer 4.6 mils in thickness. The resulting three-layer structure was dried, pressed between liquid absorbent paper and heated at 350° C. The resulting layer of plastic bonded active carbon was about 18.4 mils in thickness. Electrodes cut from the final three-layer structure gave good performance in an operating fuel cell as both oxygen and air electrodes.

EXAMPLE 2

A liquid mixture was prepared containing 55 weight percent polytetrafluoroethylene emulsion and 45 weight percent activated carbon powder and a small amount of polyvinyl alcohol. This mixture was sprayed onto the coarse pored side of a biporous nickel sheet whose coarse pored layer was 5 mils thick and whose fine pored layer was 7 mils thick. The resulting three-layer structure was pressed by rolling between release paper and was thereafter dried and heated at 350° C. The plastic bonded carbon layer was about 1-mil thick and the total thickness of the electrode after compression treatment was about 13 mils. Electrodes cut from the three-layer structure gave good performance in an operating fuel cell as air electrodes.

EXAMPLE 3

A mixture was formed comprising 35 weight percent platinum catalyzed activated carbon powder and 65 weight percent polytetrafluoroethylene. The doughlike mixture was pressed through calender rolls to form a sheet about 23 mils thick. This sheet and a biporous nickel sheet where then simultaneously passed through calender rolls to cause bonding of the plastic bonded carbon layer to the coarse pored nickel layer. The resulting structure was dried and heated at 350° C. A layer of powdered graphite was then applied to the exposed surface of the plastic bonded carbon layer and heated for a short time at 375° C. The resulting structure was about 34 mils thick, the fine pored nickel layer being about 6.5 mils, the coarse pored layer about 4.5 mils, the plastic bonded carbon layer about 16 mils, and the hydrophobic graphite powder layer about 7 mils thick. Electrodes cut from the multilayer structure gave good performance in operating fuel cells as oxygen electrodes and air electrodes. Because of the platinum catalyst, these electrodes were also suitable for use as fuel cell hydrogen electrodes.

What is claimed is:

1. A fuel cell electrode which comprises (a) a porous metal layer having relatively fine pores forming the electrolyte side of the electrode, (b) a center layer of porous metal having relatively coarse pores, one side of which is bonded to the fine pored metal layer, and (c) a gas-permeable layer of organic plastic bonded material active in fuel cell electrode reactions said material being uniformly mixed throughout said organic plastic which forms the gas side of the electrode and which is bonded to the other side of the coarse pored metal layer, at least a portion of such bonding taking place through penetration of the organic plastic bonded material into the coarse pores.

2. An electrode in accordance with claim 1 which comprises a relatively fine pored nickel layer, a relatively coarse pored nickel layer and a layer of organic plastic bonded carbon powder.

3. An electrode in accordance with claim 1 which comprises a relatively fine pored nickel layer, a relatively coarse pored nickel layer, and a layer of organic plastic bonded carbon powder, said organic plastic bonded carbon powder layer including in addition a noble metal catalyst.

4. A fuel cell system adapted to convert directly the reaction of an oxidizing gas and a fuel gas into electricity comprising at least one fuel gas electrode, at least one oxidizing gas electrode, and an electrolyte in electrochemical relationship with these electrodes, and in which at least one of said electrodes is an electrode as defined in any one of claims 1, 2 and 3.

5. In a process for producing multilayer fuel cell electrodes, the improvement comprising the steps of (1) providing a biporous metal sheet comprising relatively fine pored metal layer bonded to a relatively coarse pored metal layer, (2) providing a sheet of organic plastic bonded active material, active in fuel cell electrode reactions said material being uniformly mixed throughout said organic plastic, and (3) contacting the sheet of organic plastic bonded active material with the coarse pored side of the biporous metal sheet under sufficient pressure to cause bonding of the two sheets, at least a portion of the bonding taking place by entry of organic plastic bonded active material into the coarse pores of the biporous sheet.

6. A process in accordance with claim 5 wherein said biporous metal sheet and said sheet of organic plastic bonded active material are contacted and bonded by passing through calender rolls.

7. A process in accordance with claim 5 wherein said sheet of organic plastic bonded material is simultaneously provided and contacted with said biporous metal sheet by casting a liquid mixture containing said organic plastic and said active material onto said biporous sheet prior to application of said pressure.

8. A process in accordance with claim 5 wherein said sheet of organic plastic bonded material is simultaneously provided and contacted with said biporous metal sheet by spraying a liquid mixture containing said organic plastic and said active material onto said biporous sheet prior to application of said pressure.

References Cited

UNITED STATES PATENTS 3,321,286 5/1967 Clark et al. _____ 136—120FC
3,335,034 8/1967 Laurent et al. ____ 136—120FC

FOREIGN PATENTS 1,054,247 1/1967 Great Britain _____ 136—120FC

WINSTON A. DOUGLAS, Primary Examiner

M. J. ANDREWS, Assistant Examiner

U.S. Cl. X.R.

136—120